Sept. 19, 1933.  E. T. BENNINGTON  1,927,677
MATERIAL STORAGE AND HANDLING SYSTEM
Filed Jan. 15, 1927  2 Sheets-Sheet 2
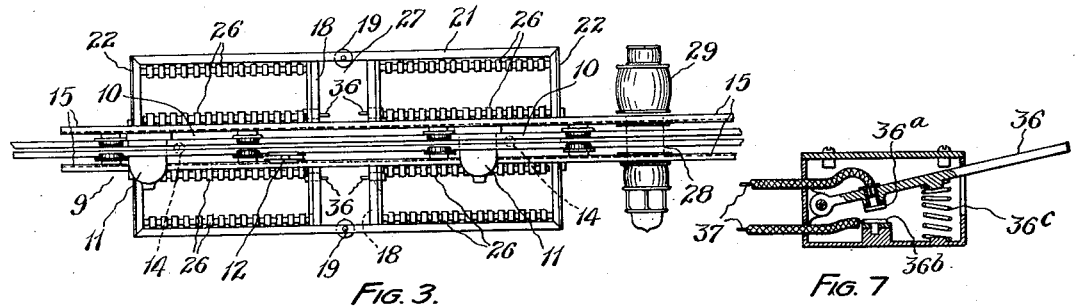
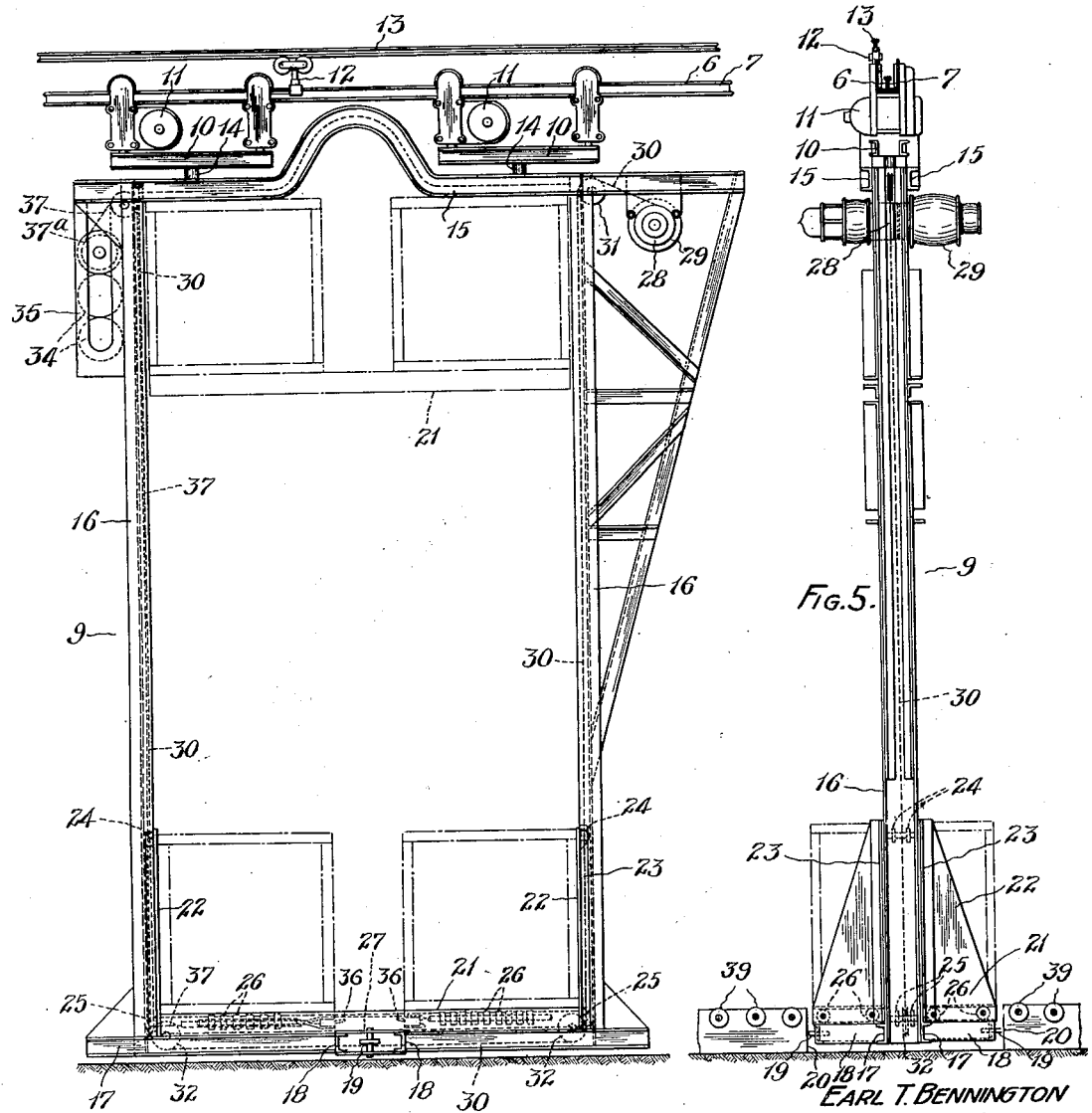

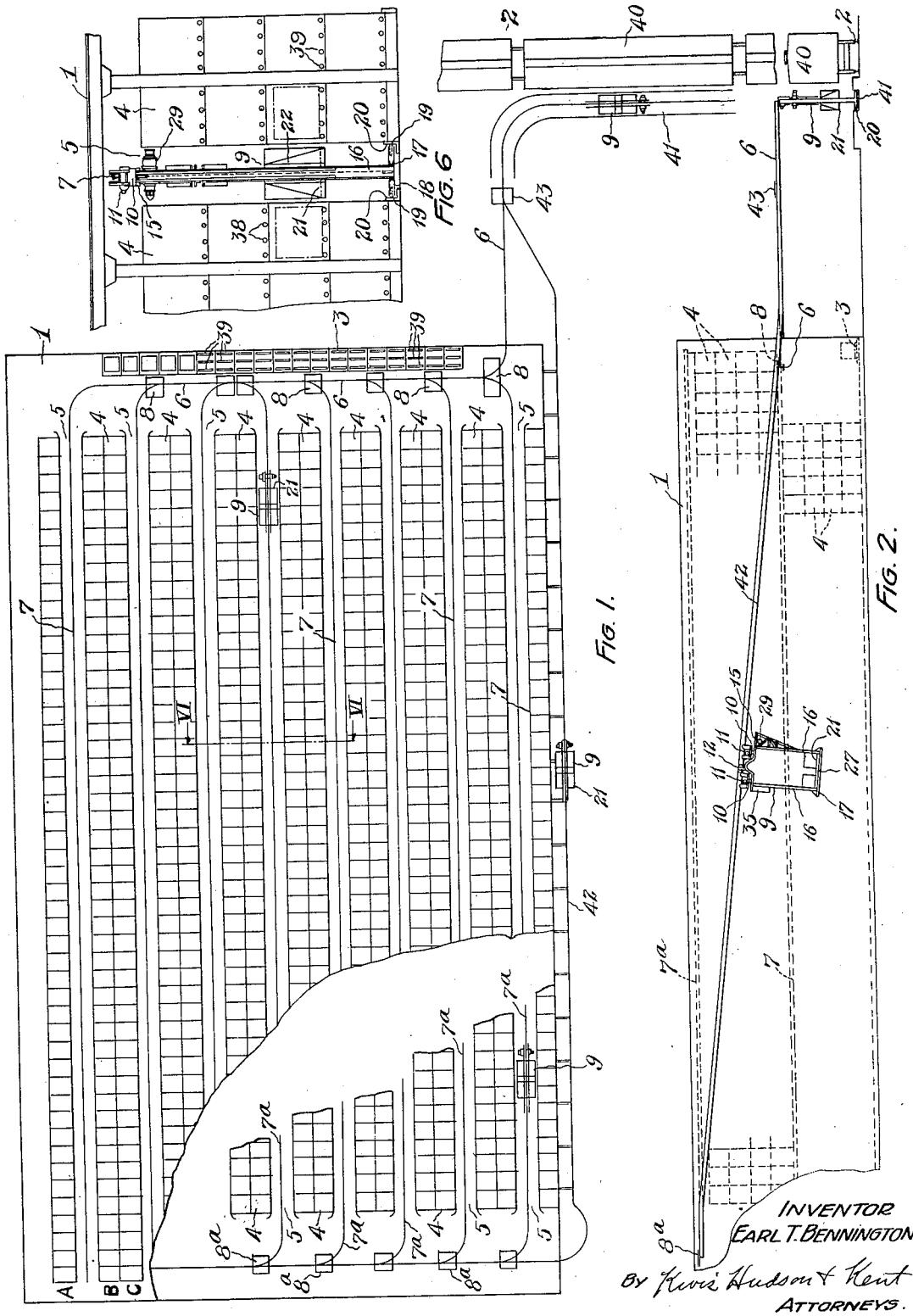

Patented Sept. 19, 1933

1,927,677

UNITED STATES PATENT OFFICE

1,927,677

MATERIAL STORAGE AND HANDLING SYSTEM

Earl T. Bennington, Cleveland Heights, Ohio, assignor to The Cleveland Crane & Engineering Company, Wickliffe, Ohio, a corporation of Ohio Application January 15, 1927. Serial No. 161,383

2 Claims. (Cl. 187—9)

This invention relates to material storage and handling systems generally, but more particularly to the handling and storage of material in warehouses, the invention having for its object to provide a material storage and handling system by which the delivery of articles to and the removal of articles from the various storage places or compartments is greatly facilitated.

In storage warehouses, it is very desirable to be able to quickly remove articles or material from any desired place in the warehouse and convey the same to a delivery point, or vice versa, to quickly transfer articles from the point at which they are received to the place in the warehouse where they are to be stored. For example, a cotton warehouse may store bales of cotton for hundreds of different owners, some having a large number of bales and others only a few. It is necessary that the various consignments be stored separately and be accessible for removal at any time. Furthermore, bales may be graded as to quality, and it is highly desirable that the bales be so stored that any bales specified can be removed with the minimum of labor.

The present invention has for an object to provide a warehouse handling system which can be installed at a relatively low cost, in which the cost of operation and maintenance is low, and which very effectively serves the desired purpose.

A further object of the invention is to provide a warehouse carrier system in which traveling carriers are employed and in which any carrier may be employed to take the articles or material to or from any storage places in the warehouse.

A further object is to provide a warehouse having the storage compartments arranged in parallel tiers and in connection therewith to provide a traveling elevator by which goods may be taken from or delivered to the compartments at any level.

A further object is to provide a monorail carrier system for warehouses where the monorail carriers are each provided with a load carrying platform adapted to be raised or lowered to receive or deliver articles at any height from adjacent the floor to adjacent the level of the overhead track.

A further object is to provide self-propelled traveling elevators in which the propelling and elevating means are controllable by an operator on the vertically movable platform of the elevator.

With the above and other objects in view, the invention may be said to comprise a storage warehouse as illustrated in the accompany drawings hereinafter described and particularly set forth in the appended claims, together with such variations and modifications thereof as will be apparent to one skilled in the art to which the invention appertains.

Reference should be had to the accompanying drawings forming a part of this specification, in which:

Fig. 1 is a diagrammatic plan view of a warehouse and material handling system embodying the invention;

Fig. 2 is a side elevation of the warehouse shown in Fig. 1;

Fig. 3 is a top plan view of one of the traveling carriages;

Fig. 4 is a side elevation of the carriage;

Fig. 5 is an end elevation of the carriage;

Fig. 6 is an enlarged fragmentary cross section through adjacent tiers of storage compartments, the section being taken on the line indicated at VI—VI in Fig. 1; and Fig. 7 is a sectional detail view showing one of the four switch pedals on the platform by which the propelling and hoist motors are controlled.

In the accompanying drawings, the invention is shown as applied to a warehouse particularly adapted for storing bales of cotton. It is to be understood, however, that it is immaterial, insofar as the present invention is concerned, for what goods or materials the warehouse is used. The various compartments or storage places may be constructed and arranged in a manner suitable to the goods or materials to be stored.

Referring to the accompanying drawings, a warehouse building is designated by the numeral 1, and at one end of this building there is shown a railway track 2 for railway cars which may serve to deliver goods to the warehouse or to receive goods therefrom. Along the same end of the warehouse there is shown a receiving and delivering platform 3 adapted to receive goods from wagons or trucks and from which goods may be loaded onto wagons or trucks. Within the building there are tiers of storage compartments arranged in parallel rows 4 extending substantially the full length of the building and having between them passageways 5 through which access may be had to the storage compartments. Extending past the ends of the rows of tiers 4 at one end of the building, there is a main overhead monorail track 6 which extends alongside the loading platform 3 and also alongside the railway track 2. Over each of the passageways 5 and extending the full length thereof, there are branch monorail tracks 7 which are connected to the main track 6 by switches 8. Suspended carriages indicated generally by the numeral 9 are mounted to travel upon the overhead monorail tracks, and any carriage may travel over the tracks 6 and 7 to any part of any of the passageways 5.

Referring particularly to Figs. 3, 4 and 5, each of the carriages 9 is provided with front and rear supporting trucks 10 which are provided with supporting wheels running upon opposite flanges of the monorail track, one set of supporting wheels of the trucks being driven by a suitable electric motor 11 by means of which the carriages may be propelled along the tracks. For supplying current to the motors 11, each truck is provided with a suitable conductor trolley 12 which runs upon a conductor rail 13. The main frame of the carriage is suspended from the trucks 10 by means of king bolts 14 which are connected to the top bars 15 of the frame. The top bars 15 have secured between them, adjacent the opposite ends thereof, vertical guide posts 16 which are connected at their lower ends by bottom bars 17, the posts 16 being of a length to extend from the top bars 15 to a point close to the floor of the warehouse. Rigidly secured to the bottom bars 17 are laterally extending arms 18 which carry upon their outer ends guide rollers 19 which are adapted to bear against guide members 20 extending along the bottoms of the tiers of compartments on opposite sides of the passageway, the guide rollers 19 cooperating with the guide members 20 to rigidly hold the carriage frame against lateral swinging movements during the movement of the carriage along a passageway. Mounted for vertical movement between the guide posts 16, there is a load supporting platform 21 which has upwardly extending standards 22 attached to the opposite ends thereof which are provided with guide flanges 23 overlying opposite sides of the posts 16. Standards 22 also carry a pair of guide rollers 24 adjacent the upper ends thereof and a pair of guide rollers 25 adjacent the lower ends thereof which engage with the inner faces of the guide posts 16.

For convenient handling of articles such as boxes or bales of cotton, a platform may be provided at opposite ends with roller beds consisting of short independently rotatable rollers 26 upon which a plurality of articles may be supported side by side and on which the articles may be moved one independently of another. Between the two roller beds at the center of the platform there is a space 27 where the operator may stand, the operator's space being provided at the center of the platform so that the operator's position is convenient for loading or unloading articles from either end of the platform. Platform 21 is raised or lowered in the frame of the carriage by means of a winding drum 28 supported by the top bars 15 adjacent one of the posts 16 and driven by a suitable electric motor 29. The cable 30 extends from the winding drum 28 over a guide sheave 31 at the top of the adjacent guide post 16, over guide sheaves 32 at the lower end of the same post and at the lower end of the opposite post and is anchored to the end of the load bar opposite that upon which the winding drum 28 is mounted. The movement of the load handling platform is sufficient to enable the platform to be positioned at the level of the floor of any compartment of a tier, and the upper frame bars 15 are arched upwardly between the trucks 10 to provide head room for the operator when the platform is in its uppermost position.

Suitable solenoid operated controllers 34 for the propelling motors 11 and for hoist motor 29 are supported from one end of the load bar 15 by a suitable bracket 35 and these controllers are operated by means of four pedals 36 projecting into the operator's space 27 on the platform. Each pedal carries a contact 36a which is adapted to engage a fixed contact 36b and is normally held up out of engagement with the contact 36b by means of a spring 36c. The pedal operated switches on the platform are connected to the controllers 34 by conductor wires 37 which extend from the switches and over an automatic take-up reel 37a carried by the bracket 35 which takes up and pays out the wires as the platform is raised and lowered. Two of the switches on the platform control the forward and reverse rotation of the propelling motors and the other two switches control the rotation of the hoist motor in opposite directions to raise and lower the platform. Since the switches on the platform are normally open either motor will be automatically stopped when the operator takes his foot from the control pedal. The pedals are preferably relatively short so that the operator will not step on a pedal accidentally, and in case of an accident causing the operator to lose his balance or be thrown from the platform, the withdrawal of the operator's foot from the pedal would automatically stop the motor.

For the facilitating of the handling of articles such as bales or boxes, the floors of the compartment may be provided with roller beds composed of short independently rotatable supporting rollers 38 parallel with the rollers 26 on the carriage platforms so that the bales or boxes can be readily pushed off the elevator platform into the storage compartments or from the storage compartments onto the elevator platform. The receiving and delivering platform 3 may also be provided with horizontal supporting rollers 39 to facilitate the transfer of articles to and from the platform.

The carriers may be employed to transfer articles to or from the platform 3 or to or from box cars 40 on the railway track 2, a guide channel 41 being provided alongside the track 2 to steady the carriage frame during loading and unloading operations.

The warehouse may be provided with a plurality of stories, each of which is provided with compartments arranged as above described. For transferring carriers from one story to the next higher story, an inclined trackway 42 is provided which extends preferably longitudinally of the building on the outside thereof, the track 42 connecting with the main track at one end of the next lower story and entering the building at the opposite end of the building adjacent the top of this story, and extending across the ends of the tiers of compartments therein. As shown herein, track 42 extends from the first to the second story and is connected by a switch 43 to the track 6, and within the second story is connected to the branch tracks 7a extending over the passageways by means of switches 8a.

In operation, the carrier may be loaded either from the platform 3 or from one of the box cars 41 and then may be propelled along the tracks 6 and 7 to a position opposite the particular compartment or compartments to which the goods are to be delivered. While the carrier is traveling along a track 7 or after the carrier has been stopped in front of the compartment to which the goods are to be delivered, platform 21 is elevated or lowered to a position at the level of the floor of the compartment, and the goods are transferred from the platform to the compartment. When it is desired to remove goods from any compartment, the operator causes the carriage to be propelled to the position in front of the compartment and positions the loading platform at the level of the floor of the compartment, transfers the goods from the compartment to the load carrying platform and runs the carrier back to the receiving platform 3 or to the box car 40 to which the goods are to be transferred.

The longitudinal rows of compartments are preferably designated in a suitable manner such as A, B, C, etc., and the successive tiers in each row and superposed compartments in each tier are preferably designated numerically so that if an operator receives an order for delivery of goods to or removal from any compartment he can very quickly drive the carrier to the designated compartment. For instance, if the order is for compartment A—203, it would mean the 3rd compartment of the 20th tier in row A and the operator would drive the carrier along the track 6 to the switch leading to the track 7 extending alongside row A, operate the switch, and while traveling along the track 7 toward the 20th tier operate the switch controlling the hoist motor to elevate the platform to the level of the 3rd compartments of the tiers so that upon arrival at a point alongside the 20th tier the platform is in proper position for transfer of goods between the designated compartment and the carrier platform.

Having thus described my invention, I claim:

1. In a material handling system, an overhead track, carriers adapted to travel along said overhead track, a longitudinally extending centrally disposed load bar supported by said carriers, vertically disposed members spaced apart longitudinally of and connected at their upper ends with said load bar, means securing the lower ends of said members together in spaced relation, a vertically movable platform associated with said members, a cable extending downwardly from the load bar beneath said platform and upwardly around a drum supported by said load bar, and means for operating said drum controllable from said platform to raise and lower the latter.

2. In a material handling system, an overhead track, carriers adapted to travel along said overhead track, a longitudinally extending centrally disposed load bar supported by said carriers, vertically disposed members spaced apart longitudinally and connected at their upper ends with said load bar, means securing the lower ends of said members together in spaced relation, a vertically movable platform associated with said members, a cable connected with said load bar and extending downwardly and beneath said platform and upwardly around a drum supported by said load bar, an electric motor for actuating said drum, a switch upon said platform for controlling the operation of said motor, a conductor between said switch and said motor, and means for winding in said conductor as said platform is elevated.

EARL T. BENNINGTON.